(12) United States Patent
Brown et al.

(10) Patent No.: US 6,389,661 B1
(45) Date of Patent: May 21, 2002

(54) LATCH SENSING SEATBELT BUCKLE

(75) Inventors: Louis R. Brown, Oxford; Antonio Esquivel, Shelby Township, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/579,087

(22) Filed: May 25, 2000

(51) Int. Cl.[7] ................................................ A44B 11/26
(52) U.S. Cl. ........................................... 24/633; 24/642
(58) Field of Search .................... 24/633–642; 297/468; 340/457.1

(56) References Cited

U.S. PATENT DOCUMENTS

| | | | |
|---|---|---|---|
| 5,060,977 A | | 10/1991 | Saito |
| 5,406,252 A | | 4/1995 | Dear |
| 5,742,986 A | * | 4/1998 | Corrion et al. |
| 5,752,299 A | * | 5/1998 | Vivacqua et al. |
| 5,839,174 A | * | 11/1998 | Chamings et al. |
| 5,898,366 A | * | 4/1999 | Brown et al. |
| 5,915,286 A | * | 6/1999 | Figi et al. |
| 5,960,523 A | * | 10/1999 | Husby et al. |
| 5,966,784 A | * | 10/1999 | Arbogast et al. |
| 6,076,239 A | * | 6/2000 | Kopetzky et al. |
| 6,079,744 A | * | 6/2000 | Husby et al. |
| 6,175,304 B1 | * | 1/2001 | Becket |
| 6,205,629 B1 | * | 3/2001 | Becker |

FOREIGN PATENT DOCUMENTS

| | | | |
|---|---|---|---|
| EP | 842832 A2 | * | 5/1998 |
| JP | 189250 | | 12/1987 |

\* cited by examiner

Primary Examiner—James R. Brittain
(74) Attorney, Agent, or Firm—Tarolli, Sundheim, Covell, Tummino & Szabo L.L.P.

(57) ABSTRACT

An apparatus includes a lockable element (16) and a buckle (12) that includes a base (28), a latch (42), a Hall effect device (60), and a pair of magnets (68) and (74). The base (28) defines a passage (32) into which the lockable element (16) is insertable. The latch (42) is made of a ferromagnetic material and is movable from a non-locking position to a locking position in which it engages the lockable element (16). The Hall effect device (60) is disposed between the magnets (68) and (74). The magnetic fields of the magnets (68) and (74) oppose each other. In the locking position, the magnets (68) and (74) provide a net magnetic field of a first magnitude that acts on the Hall effect device (60). In the non-locking position, the magnets (68) and (74) provide a magnetic field of a second magnitude acting on the Hall effect device (60) that is different than the net magnetic field of a first magnitude. The Hall effect device (60) thus has a first output when the latch (42) is in the non-locking position, and a second, different output when the latch (42) is in the locking position.

5 Claims, 3 Drawing Sheets

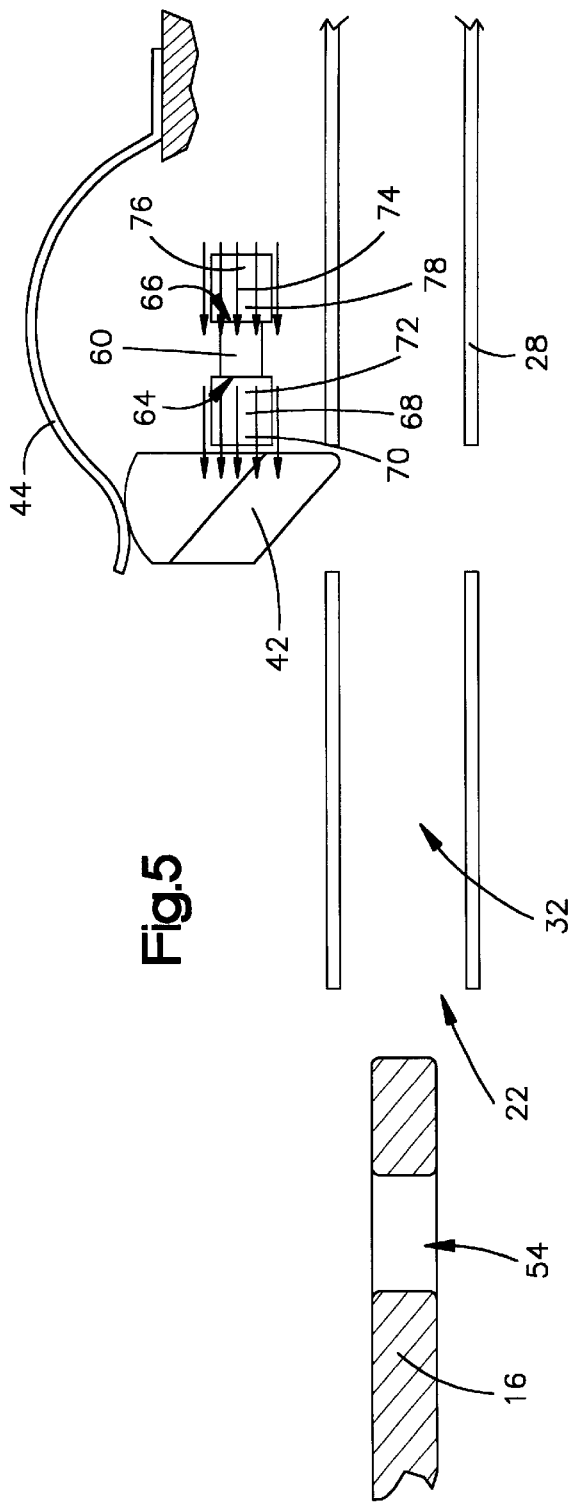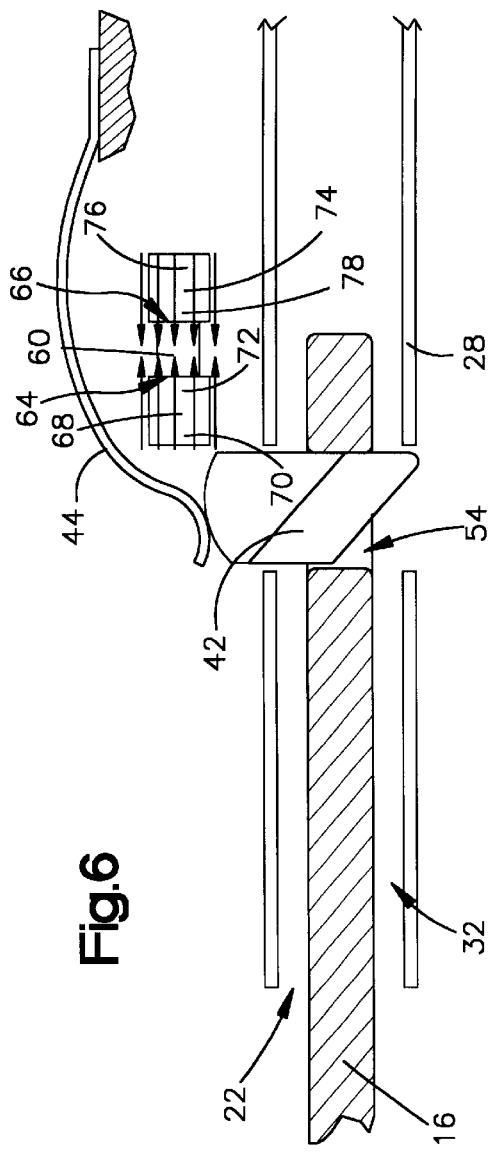

LATCH SENSING SEATBELT BUCKLE

FIELD OF THE INVENTION

The present invention relates to a seatbelt buckle. In particular, the present invention relates to a seatbelt buckle including a Hall effect device for sensing when the seatbelt buckle is in a latched condition.

BACKGROUND OF THE INVENTION

A seatbelt system for restraining a vehicle occupant typically includes seatbelt webbing, a lockable element or tongue on the webbing, and a seatbelt buckle. The tongue is inserted in the buckle when the webbing has been placed about a vehicle occupant. A latch mechanism in the buckle interlocks with the tongue to secure the webbing about the occupant. Such a seatbelt system may also include a Hall effect device for indicating whether or not the tongue is locked in the buckle.

SUMMARY OF THE INVENTION

In accordance with the present invention, an apparatus comprises a lockable element and a buckle for receiving and locking the lockable element in the buckle. The buckle comprises a base defining a passage into which the lockable element is insertable and a latch moveable from a first position to a second position in which the latch locks the lockable element against movement in the passage. The latch is made of a ferromagnetic material.

The buckle also includes first and second magnets and a Hall effect device. The Hall effect device provides an output signal, the magnitude of which is dependent upon the magnetic flux density of a magnetic field acting on the Hall effect device. The Hall effect device is disposed between the first and second magnets, which provide respective magnetic fields that oppose each other and act on the Hall effect device.

When the latch is in the second position, the latch is positioned spaced away from the magnets and the Hall effect device and the magnets provide a net magnetic field of a first magnitude that acts on the Hall effect device. When the latch is in the first position, the latch is positioned adjacent to one of said magnets and draws the magnetic field of that magnet away from the Hall effect device. Thus, in the second position, a magnetic field of a second magnitude different from the first magnitude acts on the Hall effect device. This causes the Hall effect device to have a first output when the latch is in the non-locking position, and to have a second, different output when the latch is in the locking position.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 5 is an enlarged schematic view of parts shown in FIG. 2; and

FIG. 6 is a view similar to FIG. 5 showing parts in different positions.

DESCRIPTION OF PREFERRED EMBODIMENTS

Figure 1:
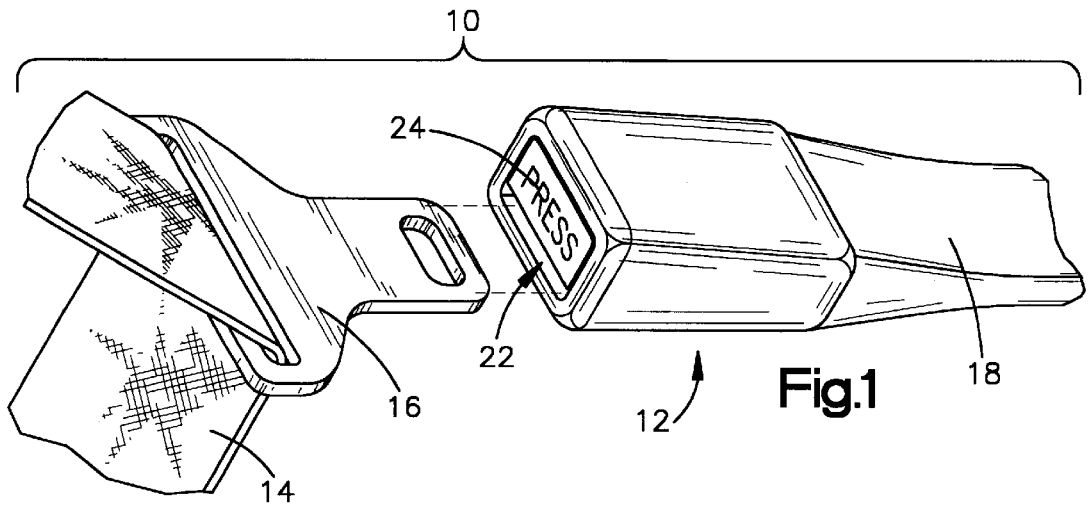
FIG. 1 is an isometric view of a vehicle occupant restraint apparatus comprising an embodiment of the present invention.

A vehicle occupant restraint apparatus 10 is shown in FIG. 1. The apparatus 10 includes a seatbelt buckle 12, seatbelt webbing 14, and a lockable element or tongue 16 on the webbing 14. The buckle 12 is anchored in a vehicle in a known manner, such as by a cable or anchor strap (not shown) extending within a cover 18. A latch mechanism 20 (shown schematically in FIG. 2) locks the lockable element 16 in the buckle 12 when the lockable element 16 is moved into an opening 22 at the end of the buckle 12. The lockable element 16 is subsequently released from the buckle 12 upon depression of a pushbutton 24 adjacent to the opening 22.

Figure 3:
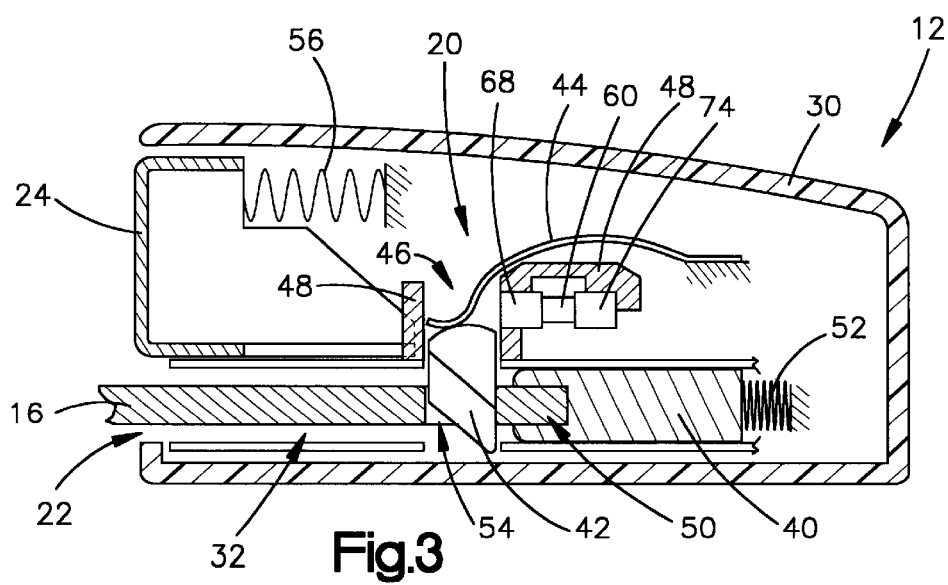
FIGS. 3 and 4 are views similar to FIG. 2 showing parts in different positions.
Figure 4:
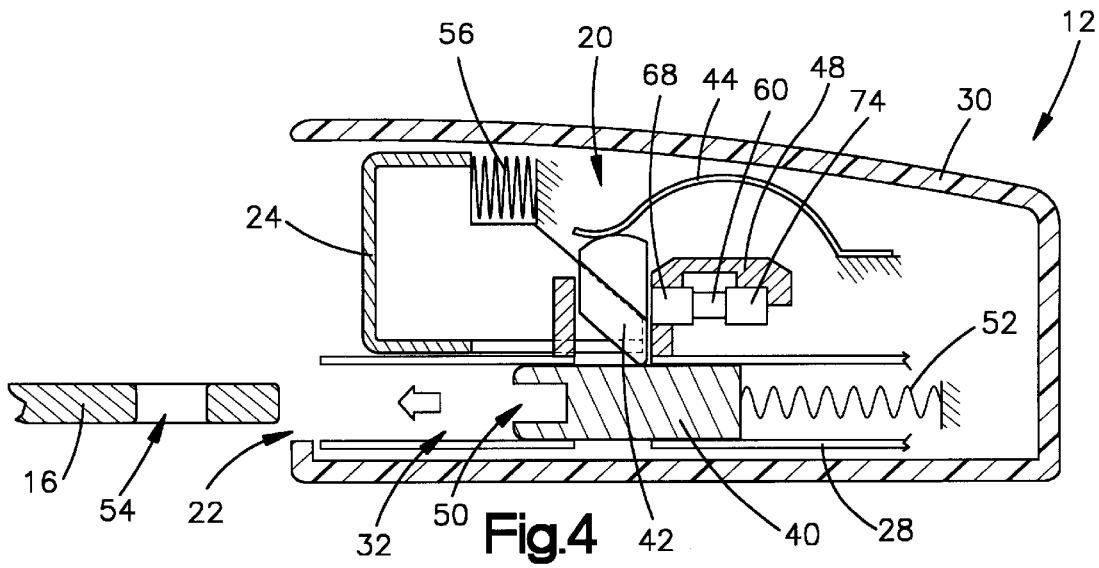
Figure 2:
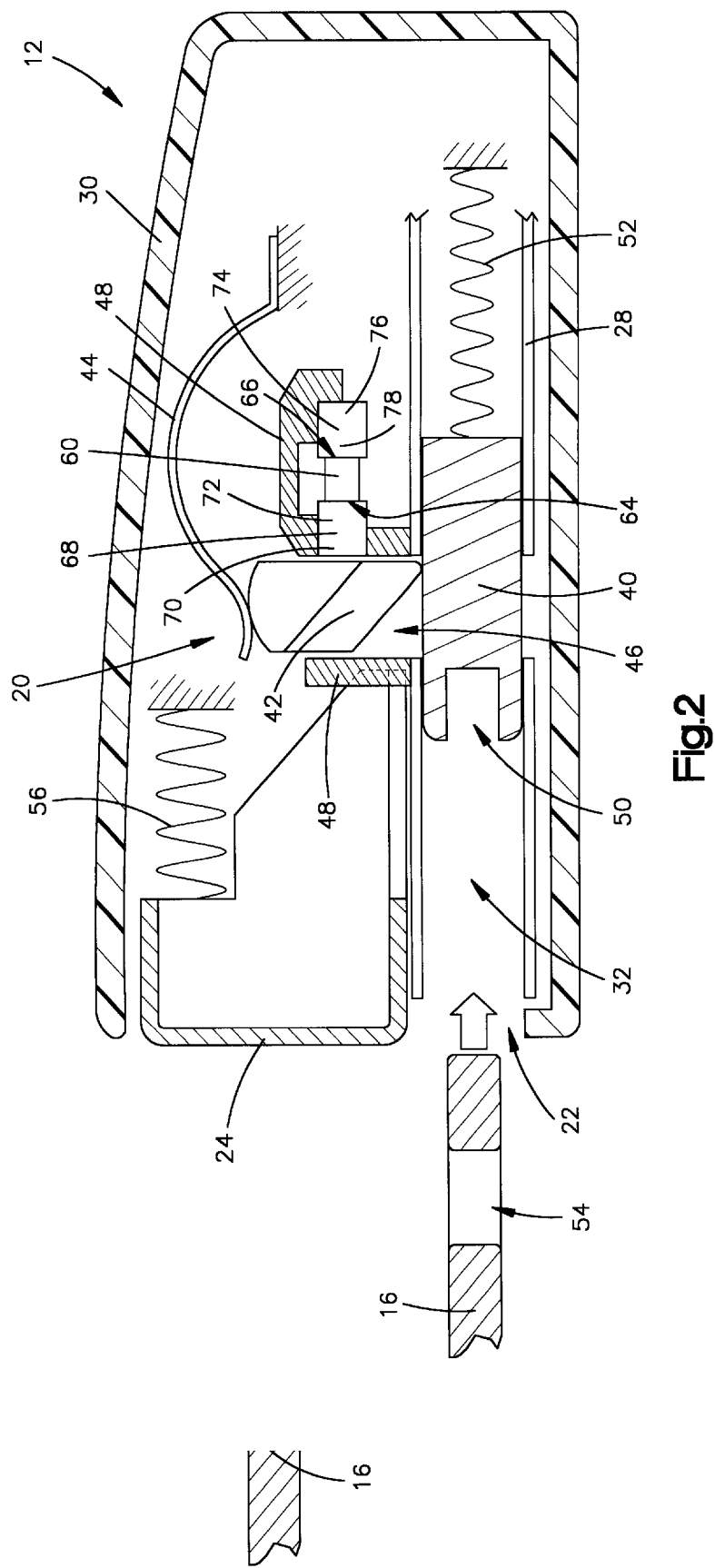
FIG. 2 is a schematic view, partly in section, of parts of the Para us of FIG. 1.

As shown in FIGS. 2–4, the buckle 12 includes a base 28 and a housing 30. The base 28 supports the latch mechanism 20 within the housing 30, and defines a passage 32 which receives the lockable element 16.

The latch mechanism 20 may comprise any suitable structure capable of releasably interlocking with the lockable element 16 in cooperation with the pushbutton 24. As shown by way of example in FIGS. 2–4, the latch mechanism 20 has a plurality of known parts including the pushbutton 24, an ejector 40, and a latch 42.

The latch 42 is movable between a non-locking position (FIG. 2) and a locking position (FIG. 3). The latch 42 moves in a direction transverse to the passage 32 in a latch channel 46 within a latch guide 48. The latch guide 48 supports and guides the latch 42. A leaf-type latch spring 44 engages the latch 42 and biases it toward the passage 32. When the lockable element 16 is not inserted into the opening 22, the ejector 40 is spring biased to a position below the latch 42 and holds the latch in the non-locking position against the bias the latch spring 44.

When the lockable element 16 is inserted into the opening 22, as indicated by the arrow shown in FIG. 2, it is moved into engagement with the ejector 40 in a notch 50 at the end of the ejector 40. The lockable element 16 is then moved inward against the ejector 40 so as to push the ejector 40 along the passage 32 from a forward position (FIG. 2) to a rearward position (FIG. 3) against the bias of an ejector spring 52.

As the lockable element 16 and the ejector 40 approach the positions of FIG. 3, an aperture 54 in the lockable element 16 moves into alignment with the latch 42. The latch spring 44 then moves the latch 42 downward to the locking position, guided by the latch guide 48 through the latch channel 46 and the aperture 54 in the lockable element 16 so that the latch 42 blocks removal of the lockable element 16 from the buckle 12.

When the lockable element 16 is to be released from the buckle 12, the pushbutton 24 is moved from the position of FIGS. 2 and 3 to the position of FIG. 4 against the bias of a pushbutton spring 56. The pushbutton 24 engages, or may be linked with, the latch 42 in a known manner so as to move the latch 42 back out of the aperture 54 in the lockable element 16 and into the latch channel 46 against the bias of the latch spring 44. The ejector spring 52 then moves the ejector 40 back outward along the passage 32 toward the opening 22 to eject the lockable element 16 from the buckle 12 as shown by the arrow in FIG. 4.

The latch guide 48 supports a Hall effect device 60, a first magnet 68 and a second magnet 74. The Hall effect device 60 has a first side 64 opposite a second side 66. The first magnet 68 has a north pole 70 opposite a south pole 72. The south pole 72 of the first magnet 68 is adhesively affixed to the first side 64 of the Hall effect device 60. The second magnet 74 has a north pole 76 opposite a south pole 78. The south pole 78 of the second magnet 74 is adhesively affixed to the second side 66 of the Hall effect device 60. The north pole 70 of the first magnet 68 is positioned adjacent to the latch channel 46. The first and second magnets 68 and 74 produce respective magnetic fields that are equal in strength and oppose each other.

In the non-locking position of FIG. 2, the latch 42 rests in a position adjacent to the north pole 70 of the first magnet 68. This is best shown in the enlarged view of FIG. 5. The latch 42 is constructed of a ferromagnetic material. In the non-locking position, the latch 42 provides a path for conducting the magnetic field of the first magnet 68 between the north and south poles 70 and 72 of the first magnet 68. Thus, in the non-locking position, the magnetic field of the first magnet 68 acts at least partially on the latch 42 whereas the magnetic field of the second magnet 74 acts primarily on the Hall effect device 60. The magnetic fields of the first and second magnets 68 and 74 are indicated by the arrows shown in FIG. 5.

Therefore, in the non-locking position, the flux density of the magnetic field supplied by the second magnet 74 and acting on the Hall effect device 60 is greater than the flux density of the magnetic field supplied by the first magnet 68 and acting on the Hall effect device 60. As a result, the Hall effect device 60 detects the magnetic field of the second magnet 74 and has a high (or "on") condition with a low output when the lockable element 16 is not locked in the buckle 12.

In the locking position of FIG. 3, the first magnet 68 rests in a position spaced apart from the latch 42. This is best shown in the enlarged view of FIG. 6, which illustrates the latch 42 spaced downwardly from its position in FIG. 5. As a result, the magnetic fields of the first magnet 68 and the second magnet 74 act primarily on the Hall effect device 60. The magnetic fields of the first and second magnets 68 and 74 are indicated by the arrows shown in FIG. 6.

In the locking position shown in FIG. 6, the first and second magnets 68 and 74 combine to create a net magnetic field acting on the Hall effect device 60. Due to the opposing nature and approximately equal strengths of the magnetic fields provided by the first and second magnets 68 and 74, the fields cancel. This provides a net magnetic field of zero or negligible strength when the latch 42 is in the locking position of FIG. 6. By a magnetic field of zero or negligible strength, it is meant that the resulting magnetic field is not able to change the state of the Hall effect device 60 to the high condition. As a result, the Hall effect device 60 has a low (or "off") condition with a high output.

As described above, the Hall effect device 60 has a high output in the low condition and a low output in the high condition. Those skilled in the art, however, will recognize that the low or high outputs may be chosen, depending on the desired use of the Hall effect device. As a result, the Hall effect device 60 could be configured to have a high output in the high condition and a low output in the low condition.

The Hall effect device 60 is thus switched from a first condition with a first output to a second, different condition with a correspondingly different output when the latch 42 moves from a position in which the latch 42 does not lock the lockable element 16 in the buckle 12 to a position in which the latch 42 locks the lockable element 16 in the buckle 12.

The Hall effect device 60 can be used to alert a vehicle occupant to the locked or unlocked condition of the lockable element 16 and buckle 12. For example, an audible alarm or a lamp on the vehicle instrument panel could be activated in response to the output of the Hall effect device 60 to alert a vehicle occupant if the lockable element 16 is not locked in the buckle 12.

The Hall effect device 60 can also be used to control one or more vehicle occupant protection devices, such as an inflatable vehicle occupant protection device, a seatbelt pretensioner, or a seatbelt retractor. For example, the Hall effect device 60 can be included in a deployment system with an inflatable vehicle occupant protection device. The Hall effect device 60 can be used to control the inflation of the protection device depending upon the buckled or unbuckled condition of the seatbelt. The inflatable device can be any one of several different types of inflatable vehicle occupant protection devices known in the art. Such inflatable devices include air bags, inflatable seatbelts, inflatable knee bolsters, inflatable side curtains, inflatable head liners, and knee bolsters operated by air bags.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a lockable element; and
   a buckle for receiving and locking said lockable element in said buckle, said buckle comprising:
      a base defining a passage into which said lockable element is insertable;
      a latch moveable from a first position to a second position in which said latch locks said lockable element against movement in said passage, said latch being made of a ferromagnetic material;
      first and second magnets; and
      a Hall effect device that provides an output signal, the magnitude of which is dependent upon the magnetic flux density of a magnetic field acting on said Hall effect device, said Hall effect device being disposed between said first and second magnets;
      said first and second magnets providing respective magnetic fields which oppose each other and which act on said Hall effect device;
      said latch when in said second position being positioned spaced away from said magnets and said Hall effect device, said magnets providing a net magnetic field of a first magnitude acting on said Hall effect device; and
      said latch when in said first position being positioned adjacent one of said magnets and drawing the magnetic field of said one magnet away from said Hall effect device, said magnets then producing a net magnetic field of a second magnitude acting on said Hall effect device, the second magnitude being different than the first magnitude.

2. Apparatus as defined in claim 1 wherein said first and second magnets have magnetic flux fields of approximately equal strength, the first magnitude of said net magnetic field being approximately zero.

3. Apparatus as defined in claim 1 wherein said Hall effect device has opposite first and second sides, said first magnet being adhesively secured to said first side, and said second magnet being adhesively secured to said second side.

4. Apparatus as defined in claim 3 wherein said first magnet has a north and a south pole, said south pole of said first magnet facing said Hall effect device and said north pole of said first magnet facing away from said Hall effect device, said second magnet having a north and a south pole, said south pole of said second magnet facing said Hall effect device and said north pole of said second magnet facing away from said Hall effect device.

5. Apparatus as defined in claim 1 wherein said buckle further includes a latch guide having a portion for supporting and guiding movement of said latch, said Hall effect device and said first and second magnets being fixed to said latch guide such that said first magnet is positioned adjacent to said portion for supporting and guiding the movement of said latch.

* * * * *